(12) United States Patent
MacEwen

(10) Patent No.: US 11,348,334 B1
(45) Date of Patent: May 31, 2022

(54) METHODS AND SYSTEMS FOR SKIN COLOR MATCHING USING AN IMAGING DEVICE AND A CONTROLLED LIGHT SOURCE

(71) Applicant: George Douglas MacEwen, San Francisco, CA (US)

(72) Inventor: George Douglas MacEwen, San Francisco, CA (US)

(*) Notice: Subject to any disclaimer, the term of this patent is extended or adjusted under 35 U.S.C. 154(b) by 0 days.

(21) Appl. No.: 16/914,426

(22) Filed: Jun. 28, 2020

Related U.S. Application Data

(60) Provisional application No. 62/868,993, filed on Jun. 30, 2019.

(51) Int. Cl.
| | |
|---|---|
| *G06V 20/20* | (2022.01) |
| *G06Q 30/06* | (2012.01) |
| *G06K 9/62* | (2022.01) |
| *G06V 10/56* | (2022.01) |
| *G06V 10/141* | (2022.01) |
| *G06V 10/426* | (2022.01) |
| *G06V 40/60* | (2022.01) |
| *G06V 40/16* | (2022.01) |

(52) U.S. Cl.
CPC ........... *G06V 20/20* (2022.01); *G06K 9/6201* (2013.01); *G06Q 30/0631* (2013.01); *G06V 10/141* (2022.01); *G06V 10/426* (2022.01); *G06V 10/56* (2022.01); *G06V 40/171* (2022.01); *G06V 40/67* (2022.01)

(58) Field of Classification Search
CPC ............. G06K 9/00671; G06K 9/6201; G06K 9/00281; G06K 9/469; G06K 9/2027; G06K 9/4652; G06K 9/00912; G06Q 30/0631
See application file for complete search history.

(56) References Cited

U.S. PATENT DOCUMENTS

| | | | |
|---|---|---|---|
| 8,200,075 B1* | 6/2012 | Lai | G03B 15/05 |
| | | | 396/50 |
| 8,693,768 B1 | 4/2014 | LaForgia | |
| 8,933,994 B2 | 1/2015 | Gross et al. | |
| 10,339,685 B2* | 7/2019 | Fu | G06T 3/0093 |
| 10,381,105 B1* | 8/2019 | Tran | C12Q 1/6876 |
| 10,951,831 B2* | 3/2021 | Seiffert | H04N 5/2256 |
| 2005/0111729 A1* | 5/2005 | Caisey | A61B 5/441 |
| | | | 382/162 |

(Continued)

*Primary Examiner* — Wesley J Tucker
(74) *Attorney, Agent, or Firm* — Edward B. Weller

(57) ABSTRACT

A system that recommends cosmetic, dermatological, or fashion items based on photos taken of a person based in part or entirely on their skin color and other defining characteristics like hair color, eye color, and/or face shape. The system includes a device with a camera and a light source capable of producing multiple intensities of light, the device running a program that instructs the user with real time feedback on how to adjust their face, phone positioning or location in order for the application to capture a set of two or more optimal photos of their face. When optimal ambient lighting is found, the program captures multiple photos, varying the light source over the different captures. Calibrated color data is calculated by comparing how the brightness and color of the diffuse reflection on the skin of the user changes compared to the brightness and color of the specular reflection of the light source in the user's eye.

19 Claims, 6 Drawing Sheets

(56) References Cited

U.S. PATENT DOCUMENTS

| | | | | |
|---|---|---|---|---|
| 2009/0245617 | A1* | 10/2009 | Bhatti | G06Q 30/0631 |
| | | | | 382/141 |
| 2011/0304705 | A1* | 12/2011 | Kantor | A61B 5/0059 |
| | | | | 348/49 |
| 2013/0300761 | A1* | 11/2013 | Ahmed | G09G 5/02 |
| | | | | 345/595 |
| 2014/0293091 | A1* | 10/2014 | Rhoads | G01J 3/513 |
| | | | | 348/234 |
| 2014/0368112 | A1* | 12/2014 | Adachi | A47G 1/00 |
| | | | | 315/76 |
| 2015/0145884 | A1* | 5/2015 | Jang | G01J 3/462 |
| | | | | 345/603 |
| 2015/0356661 | A1* | 12/2015 | Rousay | G06Q 30/0631 |
| | | | | 705/26.7 |
| 2017/0075415 | A1* | 3/2017 | Kim | G06K 9/4652 |
| 2017/0228892 | A1* | 8/2017 | Nichol | G06T 7/90 |
| 2018/0077347 | A1* | 3/2018 | Tanaka | H04N 5/23293 |
| 2019/0014884 | A1* | 1/2019 | Fu | A45D 44/005 |
| 2019/0149803 | A1* | 5/2019 | Ming | G06K 9/38 |
| | | | | 348/47 |
| 2019/0246773 | A1* | 8/2019 | Wang | H04N 5/2256 |
| 2020/0020011 | A1* | 1/2020 | Harvill | G06Q 30/0641 |
| 2020/0383629 | A1* | 12/2020 | Yoo | A61B 5/444 |
| 2021/0289128 | A1* | 9/2021 | Dong | A61B 5/0077 |

* cited by examiner

FIGURE 4: Capture images flow chart

FIGURE 5: Process images flow chart    500

METHODS AND SYSTEMS FOR SKIN COLOR MATCHING USING AN IMAGING DEVICE AND A CONTROLLED LIGHT SOURCE

RELATED APPLICATION

This application claims the benefit under 35 USC § 119 to U.S. Provisional Patent Application Ser. No. 62/868,993, filed on Jun. 30, 2019, which is incorporated by reference herein in its entirety.

FIELD

The present disclosure relates generally to performing image analysis and guiding a user on performing an image capture for better results of the image analysis, and more specifically, to systems and methods for skin color matching using an imaging device and a controlled light source.

BACKGROUND

Topical creams or lotions are frequently used for aesthetic purposes, such as covering blemishes, discolorations, and inconsistencies in the user's skin, accentuating features in the user's face, and promoting healthy skin by acting as a moisture barrier, ultraviolet (UV) radiation blocker, and a soothing and healing agent for irritated or inflamed skin.

The vast majority of individuals purchase these products at local stores because they are dependent on characteristics, such as colors that accurately match their skin color, that are not traditionally easily conveyed online or through other visual or verbal channels such as TV or by phone. Unlike so many other products, cosmetics, particularly skin color specific products, are still primarily sold in brick and mortar stores. Compounding the problem, a given user's skin color or skin needs may change over time from season to season, and location to location. These ever changing variables mean that a user cannot rely on a specific brand's specific color or formulation all year around.

Access to accurate, high quality and representative cosmetics has also proven to be an issue. Given the reliance on brick and mortar stores, less common shades are often not in stock or not even stocked at all, disproportionately affecting minority populations.

Customers often find purchasing make-up to be frustrating. Despite the assistance of sales people and in-store color matching tools, make-up purchased in a store rarely meets the needs of the consumer, rendering many make-up purchases disappointing.

If a user has access to a large cosmetics retailer, they are met with an overwhelming array of choices, forcing them to rely on a sales representative to help match them to the correct shade. In-store technical solutions often go unused because of their unintuitive design, and failure to provide substantial value over a sales representative.

The main barrier to reaching users outside of brick and mortar stores is the difficulty of providing accurate, reliable, and easy to use color matching technology. Current solutions to this problem are limited, generally requiring many involved steps by the user and are often less accurate than is desirable.

The methods and systems described in this document address these problems by providing a way for users to purchase accurately color matched cosmetics online using their mobile device running an application that guides them with tailored and easy to follow real time instructions.

SUMMARY

The method described is implemented across one or more devices, comprising at least one mobile device with an imaging device, such as a camera, and a controllable light source and possibly a server or set of servers. If a server is not used in an embodiment, the methods described as running on the server can run locally on the mobile device.

In one embodiment, the method for capturing accurate skin color starts with guiding the user to position themselves and their mobile device properly. It also places constraints on the user's settings, monitoring parts of the scene through the camera, like scene brightness and uneven lighting. Feedback is provided to the user throughout this step to guide them in making the changes.

Once the application has determined that the preconditions are met for a proper and accurate capture, the application begins the capture process. This includes locking the camera settings so the settings are the same across a set of sequential captures. The application alternates between updating the light source to different intensity and capturing an image of the user's face at that intensity for a number of different intensities. The true intensity of the light source is not known; however, the relative intensity between two different light source settings is known.

After the capture of the images, the images are processed for transfer to the server. During this time the user may be asked a series of questions about their current skin state and their needs.

The captured images are received by the server and processed to extract calibrated skin color information as well as a ground truth value match. The images are color calibrated by extracting the color of different facial regions over the different light source intensities. The reflection of the light source is also extracted from each eye of each image. The rate of change of the recorded skin colors across light source intensities compared to the rate of change of the recorded reflection intensities multiplied by the light source reflection area provides the calibrated skin color information. Normalizing the recorded skin colors to the area and color of the reflection provides a calibrated value that can be compared across mobile devices.

The calibrated skin color is compared to a set of ground truth values representing the calibrated colors of the cosmetic products. The single ground truth value that closest matches the calibrated skin color, having potentially incorporating user preference, is returned to the application running on the mobile device.

The application running on the mobile device receives the matched ground truth value and recommends a product based at least partially on that information. The user is prompted with a way to purchase that product.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION

Various embodiments of the present invention are now described with reference to the figures where like reference numbers indicate identical or functionally similar elements. Also in the figures, the left most digits of each reference number corresponds to the figure in which the reference number is first used.

Section 1: Introduction

The following details systems and methods for capturing images of a user's face, extracting skin color from those images, calibrating the skin color, and matching that color to a single ground truth color. The method is performed partially or entirely by an application running on a device having a camera, a controllable light source, memory for storing and running software, a processor for executing the software, and the capability to send and receive data over a network. The method may also be partially performed by an application on a server capable of sending and receiving information over a network, running an embodiment of the method described, as well as having memory for storing and running software and a processor for executing software. (FIG. 1) In one embodiment, the light source is a screen that the application can control.

Figure 1:
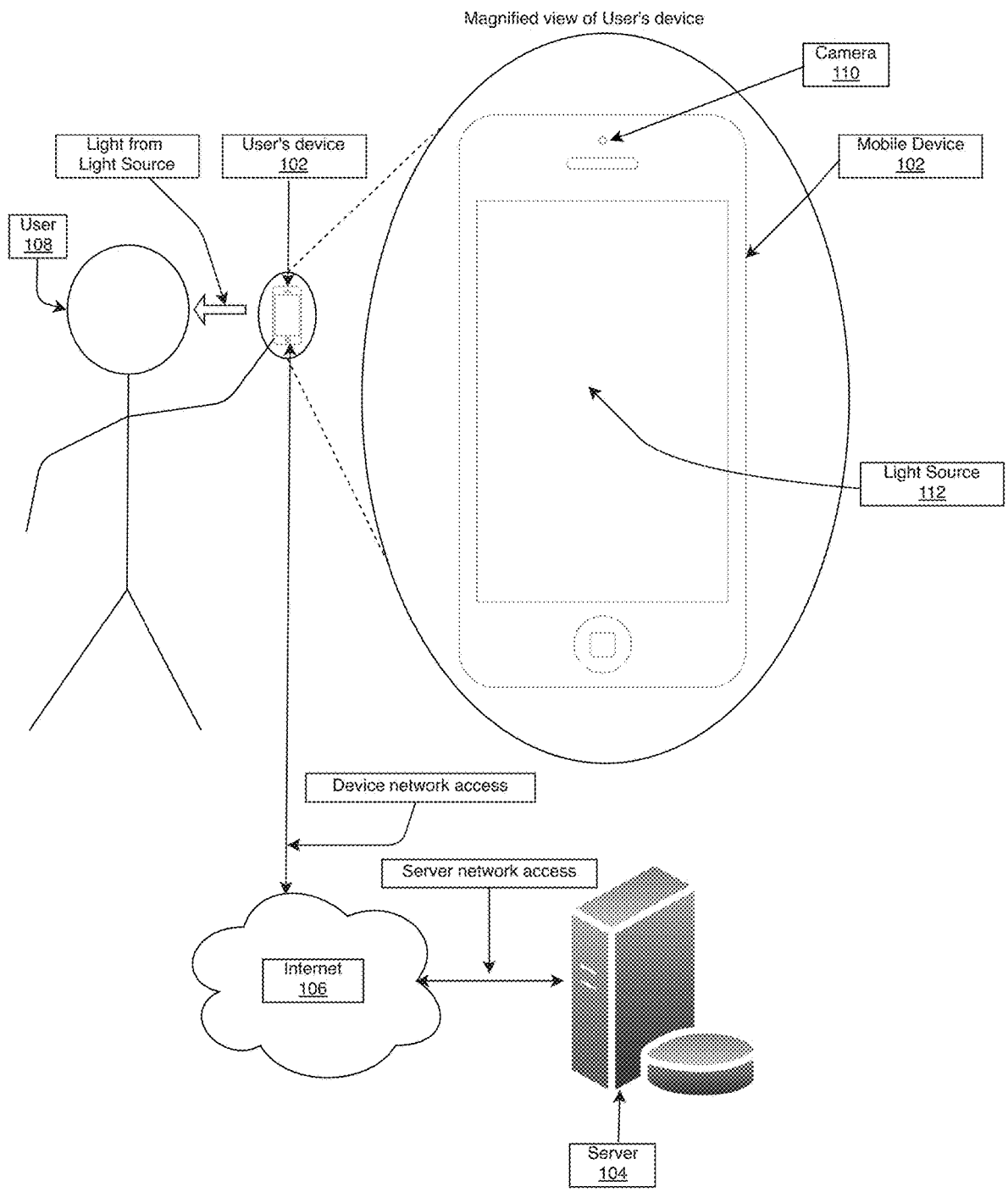
FIG. 1 is a block diagram illustrating a cosmetic matching system according to one embodiment.

FIG. 1 is a block diagram illustrating a cosmetic matching system 100 according to one embodiment. The cosmetic matching system 100 comprises a user device 102, one or more servers 104, and a communication network 106. A user 108 operates the user device 102 to capture one or more images of the user 108 and communicate the captured images over the communication network 106, such as the Internet, to the one or more servers 104. For simplicity, the one or more servers 104 are described below as server 104. The server 104 processes the captured images and sends cosmetic matching information via the communication network 106 to the user 108 for user selection of a cosmetic.

The user device 102 includes an imaging device 110, such as a camera, for capturing the images of the user 108 and also includes a light source 112 to provide light to illuminate the user 108. The imaging device 110 is referred to as the camera 110 below. The light source 112 may be the screen of the user device 102. In some embodiments, the light source 112 is a light associated with the camera 110 that illuminates objects of which an image is captured.

Figure 2:
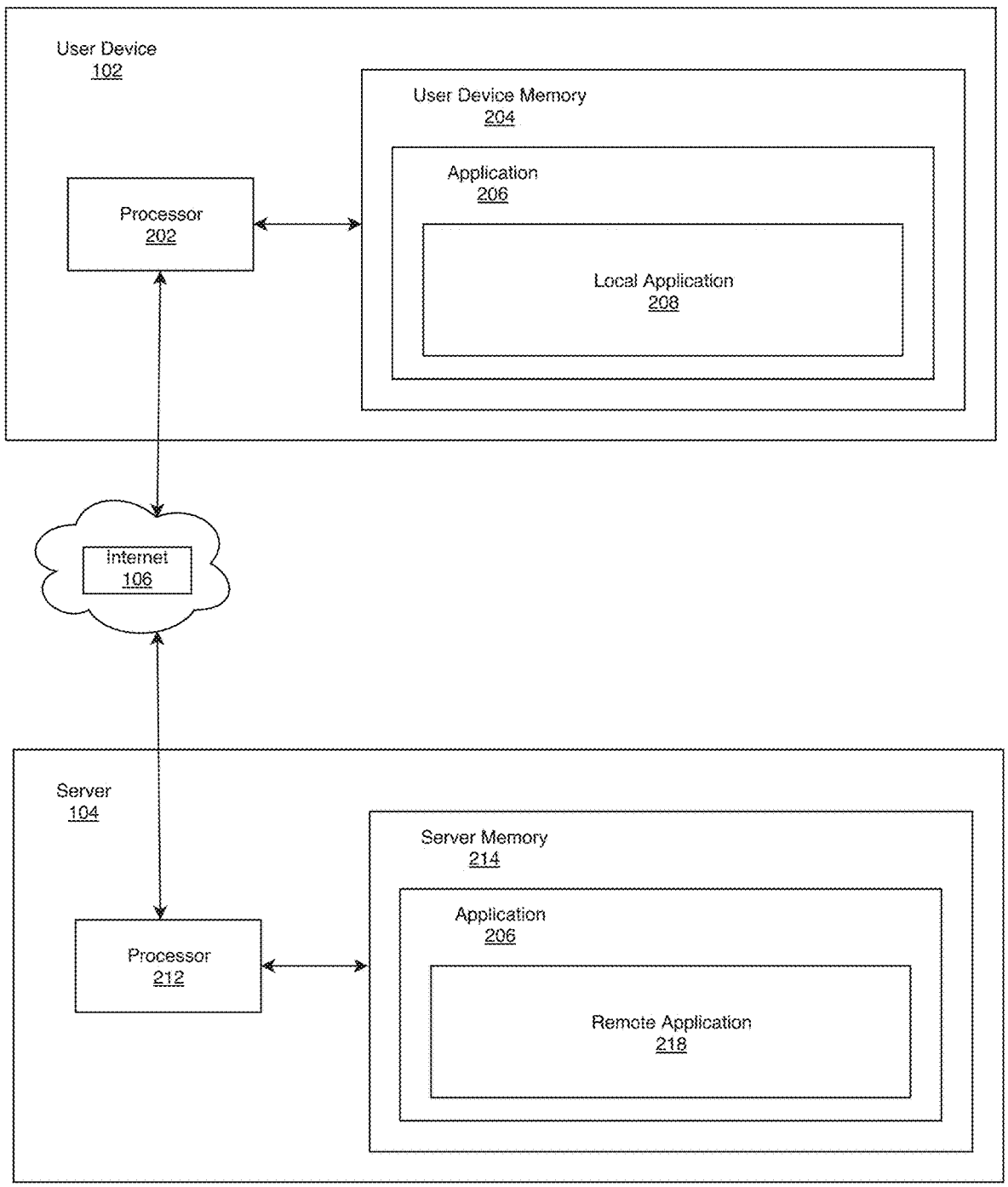
FIG. 2 is a block diagram illustrating the cosmetic matching system of FIG. 1 according to one embodiment.

FIG. 2 is a block diagram illustrating a cosmetic matching system 100 according to one embodiment. The user device 102 comprises a processor 202 and a user device memory 204. The server 104 comprises a processor 212 and a server memory 214. The user device memory 204 and the server memory 214 stores a local application 208 and a remote application 218, respectively, that form an application 206. For simplicity and ease of discussion, the cosmetic matching process is described as being performed by the application 206 instead of the local application 208 and the remote application 218. The process may be allocated to the user device 102 and the server 104. Some or all of the processes described herein may be implemented on the user device 102 instead of or in addition to the server 104.

The application 206 has the ability to landmark features on a user's face, which is referred to herein simply as "Landmarking" and the resulting facial landmarks as "Facial Landmarks" or just "Landmarks". In one embodiment, these Landmarks include the outlines of the eyes, mouth, nose, jaw, and eyebrows. Landmarking is commonly included in many devices' native software libraries as well as third party libraries such as dlib library.

The application 206 can perform actions in real time, where real time is defined in the context of near real time, where, as far as the user experiences, the results of an action happen close to instantaneously. For the rest of this document "real time" refers to this near real time definition.

The application 206 has the ability to read and set "Exposure Variables" including, but not limited to, exposure duration, ISO, white balance, exposure bias, and camera focus. These settings will be referred to below as "Exposure Variables". ISO refers to the sensitivity to light of the sensor (not shown) of the camera.

The application 206, with input from the camera 110, has the ability to "Meter" a scene, where metering is defined as the application and camera setting Exposure Variables to optimize an exposure for either a point, region, or entire scene in the camera's field of view. This is a common feature in most software interfaces to cameras. The process described above is referred to below as "Metering". In one embodiment, points or regions for metering are defined by Facial Landmarks.

Section 2: Real Time User Feedback and Capture Initiation

Figure 3:
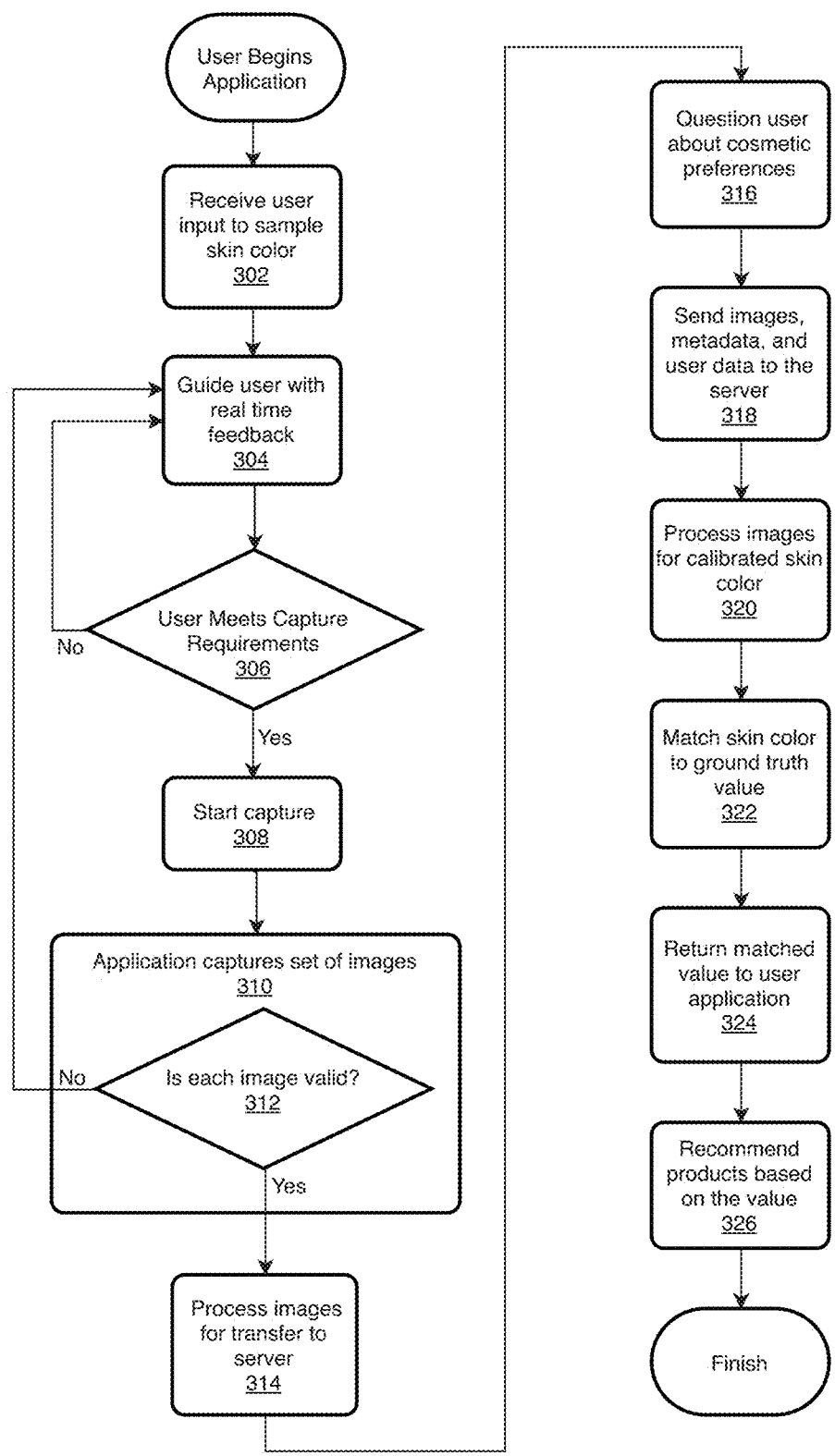
FIG. 3 is a flowchart illustrating a process flow of the cosmetic matching system of FIG. 1 according to one embodiment.

FIG. 3 is a flowchart illustrating a process flow 300 of the cosmetic matching system 100 according to one embodiment.

After the user 108 starts the application 206, the application 206 receives, at 302, user input to sample skin color of the user 108. At 304, the application 206 provides real time feedback to the user 108 on the user device 102, based on a number of variables as described below in more detail. The feedback guides the user 108 to position themselves and the user device 102 in a way that ensures an optimal image capture can be made.

In one embodiment, the application 206 presents a button to begin the image captures. The application 206 may block, at 306, the user 108 from initiating an image capture until all conditions for optimal image capture have been met.

In one embodiment, the application 206 automatically initiates, at 308, the image capture once all conditions have been met at 306.

In one embodiment, the application 206 generates, at 304, Facial Landmarks for frames in the camera's video output in real time.

In one embodiment, the application 206 meters, at 304, the scene, choosing the region to meter to based on the relative brightnesses of a set of regions. These regions are defined by the Facial Landmarks.

The application 206 provides, at 304, real time feedback to inform the user of their fulfillment of none, one, or more of Feedback Attributes. Feedback Attributes may be, for example, lighting on the user's face, the brightness of the scene, proximity between the user and the mobile device, or obstructions to an accurate image capture.

In one embodiment, the application 206 provides, at 304, the lighting on the users face Feedback Attribute when the application 206 checks whether the ambient lighting is illuminating the user evenly.

In one embodiment, the application 206 provides, at 304, the brightness of the scene Feedback Attribute when the application 206 calculates the brightness from the Exposure Variables generated by the automatic metering of the camera 110.

In one embodiment, the application 206 provides the proximity between the user 108 and mobile device Feedback Attribute at 304 when the application 206 instructs the user 108 to bring the mobile device 102 as close to the user's face as possible without regions of the face falling outside the field of view of the camera 110.

In one embodiment, the application 206, at 304, provides the proximity between the user and mobile device Feedback Attribute when the application 206 uses the real time Facial Landmarks to determine the bounds of the user's face.

In one embodiment, the application 206 provides, at 304, the obstructions to an accurate image capture Feedback Attribute when the application 206 monitors for obstructions such as, but not limited to, glasses, scarves, hats, hands, and hair.

The application 206 may also provide, at 304, Feedback Attributes for the orientation of the user, movement of the mobile device or user, rapid or frequent lighting changes, excessive makeup or other topical agents applied to the user's skin, excessive shininess or specular reflection on the user's skin, or excessive blushing, flushed skin, or redness of the skin.

In one embodiment, the application 206 provides, at 304, the orientation of the user Feedback Attribute when the application 206 checks that the user 108 is directly facing the mobile device 102, keeping their head vertical, and face square with the mobile device 102.

In one embodiment, the application 206 provides, at 304, the mobile device 102 or user 108 movement Feedback Attribute when the application 206 checks that the mobile device 102 and the user 108 are not moving relative to each other. The application 206 measures mobile device 102 movement using sensors on the device 102 such as accelerometers. The application 206 measures user movement with real time Facial Landmarks.

In one embodiment, the application 206 provides, at 304, the rapid or frequent lighting changes Feedback Attribute when the application 206 records how the ambient lighting is changing across the user's face. If the lighting is changing too rapidly or frequently the application 206 informs the user 108.

In one embodiment, a user 108 is using a mobile device 102 with a front facing camera 110. The application 206 provides, at 304, the user 108 with a real time video of the users face. The application 206 provides the user 108 with real time feedback in the form of a text overlay over the video.

In one embodiment, the application 206 provides, at 304, the user 108 with real time feedback in the form of graphical overlays such as arrows.

In one embodiment, the application 206 provides, at 304, the user 108 with real time feedback in the form of verbal instructions, played through a speaker on or connected to, the user device 102.

Section 3: Capturing Images Under Varying, Controlled Lighting Conditions

The application 206 begins, at 310, the capture of the images, and validates, at 312, the captured images.

Figure 4:
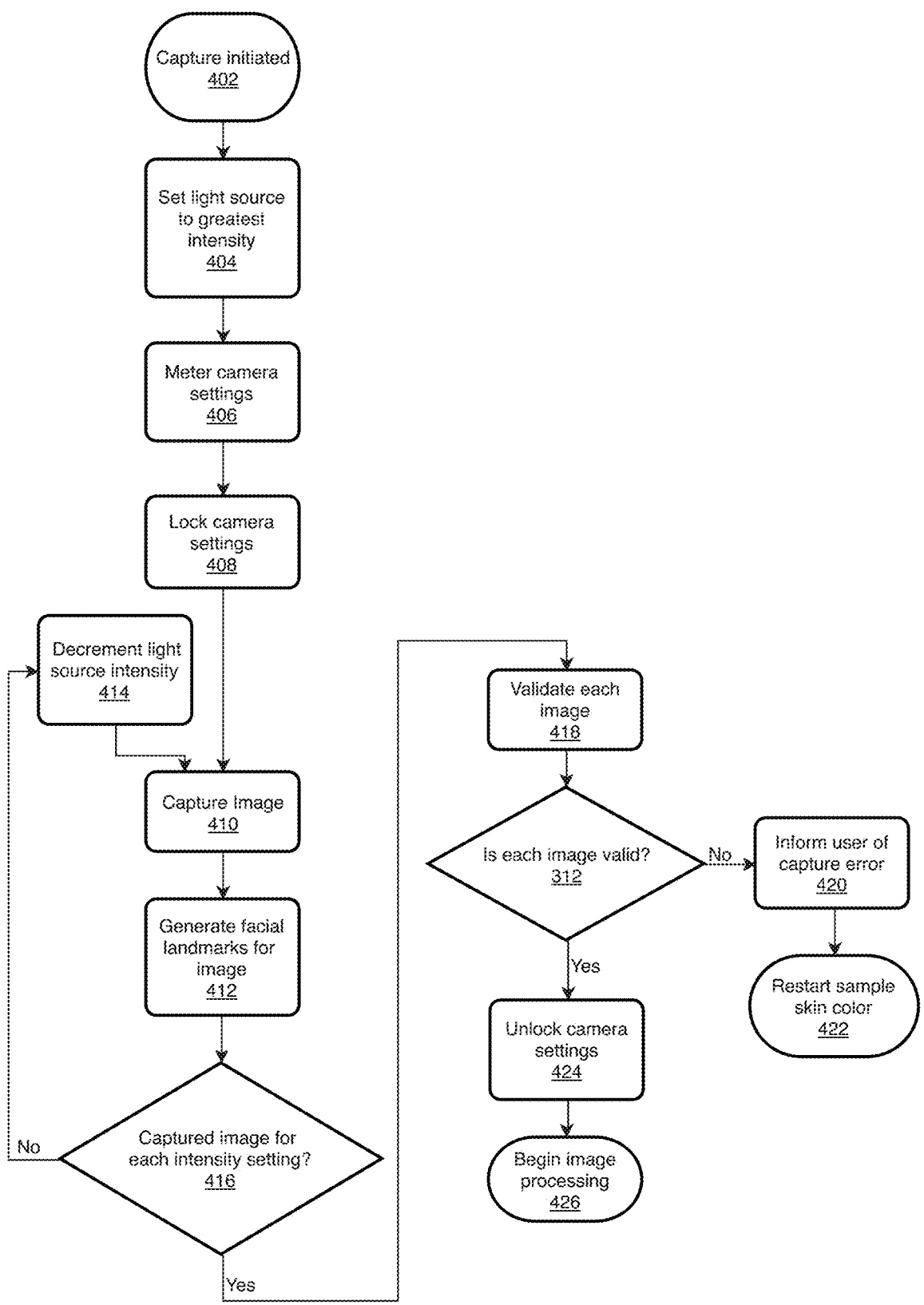
FIG. 4 is a flowchart illustrating a process flow of capturing images of the process flow of FIG. 3 according to one embodiment.

FIG. 4 is a flowchart illustrating a process flow 400 of capturing images according to one embodiment. The process flow 400 is one embodiment of the capturing of images at 310 (FIG. 3).

Step 1:

Upon the initiation of the image capture at 402, the application 206 sets, at 404, the light source 112 to the highest intensity setting the application 206 will use.

In one embodiment, the application 206 fills a defined region of a screen 100% with white and sets the mobile device screen (light source 112) to its maximum brightness. The application 206 uses the mobile device screen as the light source 112.

Step 2:

The application 206 controls, at 406, the camera 110 to meter to the scene under the new lighting conditions.

The application 206 saves or locks, at 408, the Exposure Variables Metered by the camera 110 under the new lighting conditions. Saving or locking in this context refers to the ability to apply those metered settings to the camera 110 in the future, which includes locking the camera settings or reapplying saved camera settings for each exposure the camera 110 makes.

In one embodiment, the application 206 meters to the brightest point on the user's face to prevent loss of skin color data as a result of over exposure.

In one embodiment, the application 206 minimizes the ISO in exchange for an increase in exposure duration in the Metered Exposure Variables, producing an image with lower signal noise while achieving the same target brightness.

In one embodiment, the application 206 changes the Metered White Balance in the Exposure Variables in order to maximize the dynamic range, optimizing either for skin color or expected specular reflection color.

Step 3:

Upon locking or saving the Exposure Variables at 408, the application 206 captures, at 410, the first image. For each capture, the application 206 generates, at 412, Facial Landmarks for every image. The application 206 then changes, at 414, the light source intensity 112 in a known increment, followed by another image capture at 410). This is repeated until the target number of images under the varying lighting conditions are captured at 416. The application 206 captures, at 410, each image with identical settings, defined by the locked or saved Exposure Variables. The resulting set of images is referred to as the "Captures" in the rest of this document.

In one embodiment, the application 206 captures an image with the light source 112 as a defined region of the mobile device screen 100% filled with white. After the capture is completed, the application 206 fills the defined region of the screen with 90% white, ensuring that white is equally distributed across the screen region. The application 206 then takes another capture. The application 206 repeats these two steps of changing the mobile device screen region area illumination and capturing an image for 80%, 70%, and 60% screen area illuminations.

In one embodiment, the application 206 captures a set of one or more images for each light source 112 intensity.

In one embodiment, the application 206 captures an image with the light source 112 generating the total light source intensity by unevenly illuminating different regions of the mobile device screen.

In one embodiment, the application 206 captures an image with the light source 112 as a defined region of the mobile device screen with the screen pixels illuminated in a pattern such that the light from the pixels compensates for uneven ambient lighting on the user's face. The first capture is captured with the compensation pattern at 100% intensity. After the capture is completed, the application 206 adjusts compensation pattern to 90% intensity and takes another capture. The application 206 repeats these two steps of changing the compensation pattern intensity and capturing an image for 80%, 70%, and 60% compensation pattern intensities. In one embodiment the intensity of the compensation pattern is adjusted by evenly changing the number of pixels at full brightness and zero brightness throughout the pattern, the ratio of pixels defined by a target intensity.

In one embodiment, the application 206 provides a point or graphic on the mobile device screen for the user to focus on throughout the light source intensity changes.

The application 206 validates, at 418, the Captures by checking none, one, or more validation attributes. Validation attributes may include Facial Landmarking, Blurriness, User Movement, Blinking, Closed or Partially Closed eyes, Obstructions, or Variation in Exposure Variables. If a capture is not valid at 312, the application 206 informs, at 420, the user 108 of the error, and the application 206 begins, at 422, the skin color sampling process again at 304.

In one embodiment, the application 206 validates the Facial Landmarks validation attribute when the application 206 generates Facial Landmarks for each image that is checked. If the application 206 can not generate Facial Landmarks, or there are issues in the validity of the data, the application 206 instructs, at 420, the user to redo, at 304, the capture.

In one embodiment, the application 206 validates the Blurriness validation attribute when the application 206 takes a crop of each eye, the crop having been calculated using the Facial Landmarks. The application 206 converts each eye crop to a linear RGB color space from the sRGB colorspace. The application 206 stretches each eye crop's histogram to match all of the other eye crop histograms to compensate for the different illuminations. The application 206 applies a Fast Fourier Transform algorithm to each eye crop. The application 206 calculates the mean of the Fast Fourier Transform as an approximation for image sharpness. If an eye crop image has a dramatically lower mean than the other eye crop images, it is most likely blurry. If one or more of the eye crop images are blurry, the application 206 instructs, at 420, the user 108 to redo, at 304, the capture.

In one embodiment, the application 206 validates the User Movement validation attribute when the application Landmarks the Captures and checks that no one Landmark moves more than 5% of the image width or height between sequential captures. If any Landmarks have moved more than the threshold, the application 206 instructs, at 420, the user 108 to redo, at 304, the capture.

In one embodiment, the application 206 validates the Blinking, Closed, or Partially Closed Eyes validation attribute when the application 206 Landmarks the Captures and uses the Landmarks to measure the users eye. This allows the application 206 to detect if the user's eye is open or closed. If either eye in any capture is closed, the application 206 instructs, at 420, the user 108 to redo, at 304, the capture.

In one embodiment, the application 206 validates the Obstructions validation attribute when the application 206 samples a number of facial regions defined by the facial landmarks. The application 206 converts the sample RGB values to the HSV color space. If the hue of any of the sample regions differs significantly from the other samples, the application 206 instructs, at 420, the user to redo, at 304, the capture.

In one embodiment, the application 206 validates the Exposure Variable Variation validation attribute when the application 206 extracts the Exposure Variables for each capture from that capture's metadata. The application 206 compares the Exposure Variables across captures to make sure they are identical. If there is a discrepancy, the application 206 instructs, at 420, the user 108 to redo, at 304, the capture.

If each image is valid at 312, the application 206 unlocks, at 424, the camera settings and begins, at 426, image processing.

Section 4: Image Preparation and Transfer to Server

Refer again to FIG. 3.

Step 1:

After the application 206 completes capturing the images at different light source intensities, the application 206 processes, at 314, image captures for transfer to the server 104.

In one embodiment, the application 206 crops each capture as closely to the user's head as possible so that just the user's face, hair, upper part of the neck, and surrounding features remain. This decreases the total size of the images for faster network transfer and lower storage requirements.

In one embodiment, the application 206 rotates each image to ensure consistent, vertical orientation of the user's head.

In one embodiment, the application 206 converts the images to a linear color space from the nonlinear color space the images were captured in. An example of a nonlinear capture color space is sRGB or DCI-P3.

In one embodiment, the application 206 separates each image into a group of three images based on the requirements of the color extracting algorithm, for example, maximum detail in the eye regions. The application 206 extracts the eye regions of the image, as defined by the Facial Landmarks, at full resolution. The application 206 downsizes a copy of each full head image capture to a resolution that still contains the data sufficient to extract proper skin color information.

In one embodiment, the application 206 extracts the user's face, facial features, and hair from the image using semantic segmentation. The application 206 sets anything that is not the face, facial feature, or hair to a black pixel value to reduce the size of the image after compression.

Step 2:

Whether each capture is divided into a set of images or not, all images derived from the same capture will be referred to as an "Image Set". The application 206 keeps the metadata for each Image Set with its corresponding Image Set for transfer to the server 104.

The application 206 adds fields, containing records, to the metadata in order to represent additional information about the image set. In one embodiment, the application 206 transfers Facial Landmark data to the server 104 in the Image Set metadata. In another embodiment, the application 206 transfers information about color space, rotation, exposure variables, and cropping to the server 104.

Each Image Set metadata contains a record of the light source illumination the image set was captured with. In one embodiment, the application 206 adds a record containing "illuminationRatio: 1.0" signifying the image was captured under full screen region illumination.

Step 3:

Each image in each Image Set is converted to a portable image format such as PNG or TIFF for transfer to the server.

In one embodiment, the application 206 converts each image in each Image Set to PNG, taking advantage of lossless compression in the process.

Section 5: Questions for the User and Transfer to Server

In one embodiment, the application 206 asks, at 316, the user 108 questions pertaining to, but not limited to, their current skin state, skin condition, dermatological requirements, cosmetic requirements, and skin health. The topics in question can be, but are not limited to, redness, dry skin, oily skin, vitiligo, coverage, SPF, or preference for lighter or darker or warmer or cooler skin color results.

In one embodiment, the application 206 sends, at 318, the question/answer data to the server 104 along with the image sets to enable the color matching algorithm to make more accurate, personalized product recommendations to the user 108.

The application 206 also sends, at 318, the image sets, metadata, and user data to the server 104.

Section 6: Processing Images for Calibrated Skin Color Information

Figure 5:
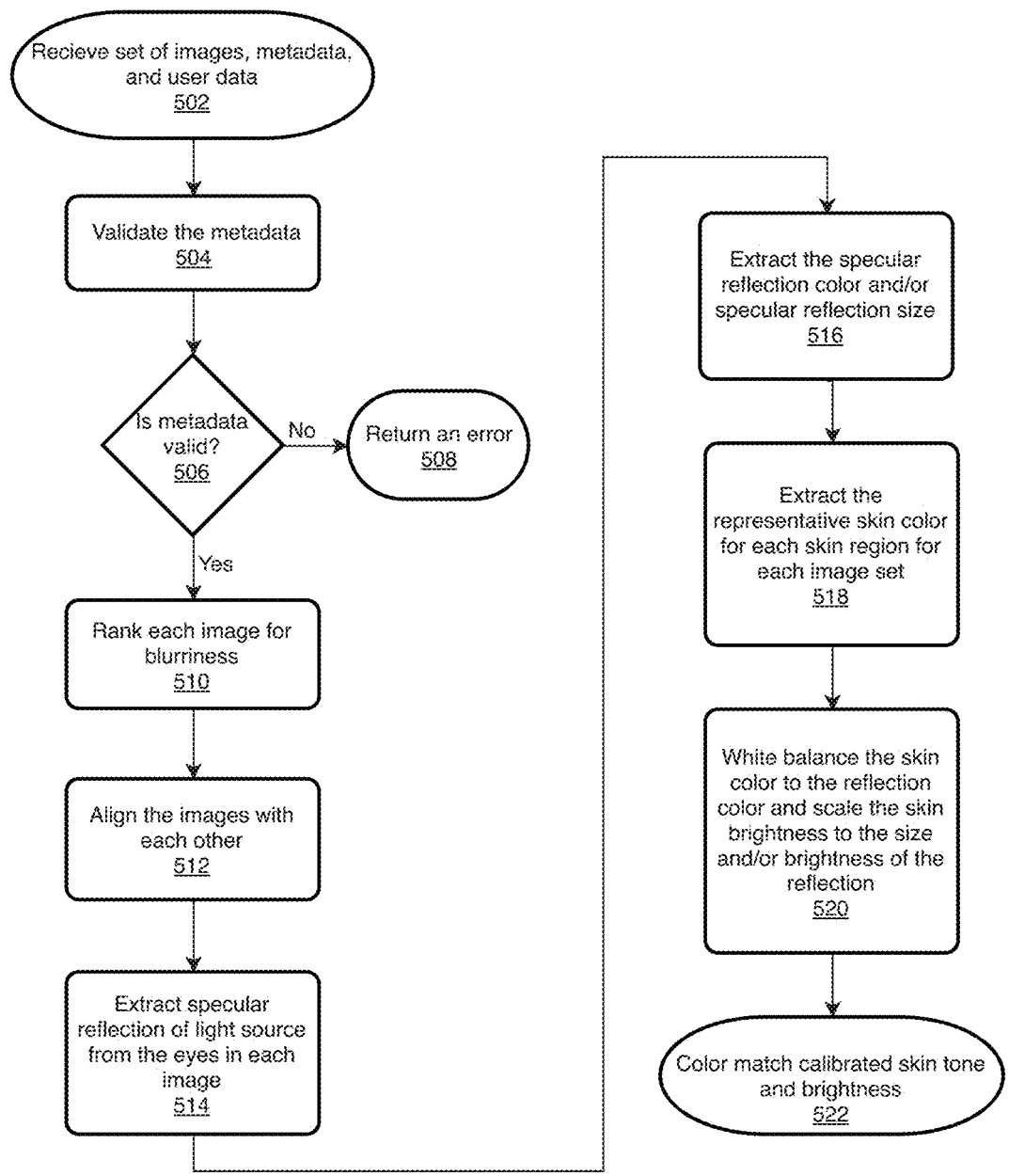
FIG. 5 is a flowchart illustrating a process flow of processing images of the process flow of FIG. 3 according to one embodiment.

The application 206 processes, at 320, images for calibrated skin color,

FIG. 5 is a flowchart illustrating a process flow 500 of processing images according to one embodiment. The process flow 500 is one embodiment of the processing images at 320 (FIG. 3).

Step 1:

When a set of Image Sets arrives at the server 104, the application 206 loads, at 502, the Image Sets and corresponding metadata into the server memory 214.

In one embodiment, the application 206 validates, at 504, the metadata for each Image Set against the metadata of the other Image Sets to ensure that all the Image Sets are captured with identical Exposure Variables. If the Exposure Variables do not match at 506, the application 206 returns, at 508, an error to the user device 102.

In one embodiment, the application 206 extracts the eyes from each Image Set. The application 206 converts each eye to a linear RGB color space from the sRGB colorspace. The application 206 stretches each eye crop's histogram to fill the full numerical range (0 to 255 for 8 bit color channels) to compensate for the different light intensities. For example, using 8 bit colors, if the red channel's lowest value is 40 and its highest value is 220, then all of the red channel values are subtracted by 40 and multiplied by 255/(220–40).

The application 206 measures each Image Set's blurriness and ranks, at 510, the Image Set against the rest of the Image Sets.

In one embodiment, the application 206 calculates the mean of the Fast Fourier Transform as an approximate for image sharpness. If an image has a dramatically lower mean than the others, it is likely blurry. The application 206 returns an error if three or more of the image sets are dramatically blurrier than the rest in the image sets. The application labels the blurriest two image sets as blurry and avoids using them in certain future computations where sharp images are needed.

In one embodiment, the application 206 labels the sharpest Image Set, marking this set is the delegate Image Set to be used where sharpness is needed for maximum accuracy.

Step 2:

The application 206 aligns, at 512, the Image Sets with each other so that facial features precisely line up with each other.

In one embodiment, the application 206 calculates rough offsets between the Image Sets using the Facial Landmarks. Facial Landmarks are not pixel level accurate, so further processing is performed to calculate the final offset.

In one embodiment, the application 206 converts the eye crops for each image set to a linear RGB color space. Then, processing the left and right eyes individually, the application 206 stretches each eye histogram to match the eye histograms on the same side of the face. The application 206 runs an edge emphasis algorithm over each resulting image, such as a Sobel Filter.

In the same embodiment, the application 206 uses a phase correlation algorithm on the resulting edge emphasized image to calculate the offset of each eye from the eye in the Image Set that was determined to be the sharpest, per side. If there is a discrepancy between the left and right side offsets, the application 206 takes the average of the two offsets. Combining these refined offsets with the landmark offsets provides a pixel level accurate alignment of the different image sets.

In one embodiment, the application 206 crops the Image Sets so the Image Sets perfectly align.

Step 3:

The application 206 extracts, at 514, the specular reflection of the light source 112 from each eye in each Image Set. The application 206 extracts, at 516, the specular reflection color, referred to as the Measured Reflection Color, or the specular reflection size, referred to as the Measured Reflection Size, or both.

In one embodiment, the application 206 extracts the specular reflection of the light source from the eyes in the Image Sets by calculating which pixels of the eye change the least between the least illuminated image set and the most illuminated image set. The pixels in this set are the pupils of the eye, with the specular reflection either partially or entirely contained within the pupils.

In one embodiment, the application 206 extracts the specular reflection of the light source by finding the contours enclosing all of the pixels with a value below a predetermined inter-illumination change threshold. Contained in those pixels should, at least partially, be the specular light source reflection.

In the same embodiment, the application 206 extracts the pixels contained in the contour whose value changes the largest amount from the least illuminated image set to the most illuminated image set. These pixels are the specular reflection of the light source. The application 206 extracts pixel values and geometric information about the light source's specular reflection in the eyes.

In one embodiment, the application 206 calculates the smallest rectangle that fully encloses the specular reflection of the light source. This is referred to as the bounding box of the specular reflection. The application 206 calculates the number of pixels contained in the bounding box.

In one embodiment, the application 206 extracts the bounding box of the specular reflection from the Image Set that is determined to be sharpest in order to provide the most accurate measurement.

In one embodiment, the application 206 counts the number pixels determined to be the specular reflection of the light source 112, this is referred to as the measured reflection size.

In one embodiment, the application 206 defines the units of measurement for the measured reflection size to be in terms of fractions of the user's eye width. The application 206 calculates the width of the user's eye from the Facial Landmarks in pixels. The resulting unit of measurement, pixels per eye width, allows measurements to be made in terms of fractions of eye width, allowing the application 206 to leverage the fact that eye width is consistent across gender, race and age after maturity, and as such can be applied to multiple users and devices. This unit of measurement allows the application 206 to compare results across different user devices 102.

In one embodiment, the application 206 divides the dimensions of the reflection bounding box, measured in pixels, by the eye width, measured in pixels, giving the size of the bounding box in terms of eye widths. The application 206 multiples the dimensions of the bounding box together to give the Measured Reflection Size in terms of eye widths.

In one embodiment, the application 206 calculates the area of one pixel in terms of eye widths squared. The application 206 multiplies the area of a pixel by the number of pixels in the light source reflection to give the Measured Reflection Size in terms of eye widths.

In one embodiment, the application 206 averages the Measured Reflection Sizes for all eyes in Image Sets. The resulting area is referred to as the "Reflection Size".

The reflection color and reflection size that result from the combined processing of the Image Sets are referred to as the "Reflection Color" and "Reflection Size," respectively, for the rest of this document.

Step 4:

The application 206 extracts, at 518, the measured skin region color for each skin region in each image set.

In one embodiment, the application 206 masks the skin regions such that skin covered by a specular reflection is excluded from the regions.

In one embodiment, the application 206 defines the skin regions using polygons created from the Facial Landmarks. The skin regions the application samples are the forehead, chin, left cheek, and right cheek. The application 206 calculates the median subpixel value (subpixels being the red, green, and blue components of an RGB pixel) for each skin region and combining them into an RGB triplet, which represents the median skin color value of that specific skin region, referred to as the measured skin region color.

Step 5:

The application 206 calculates, at 520, the calibrated color of the skin by white balancing the skin color to the light source Reflection Color. The "brightness" of the skin color is scaled to the Reflection Brightness and/or the Reflection Size.

In one embodiment, the application 206 converts all the measured specular reflection colors of the light source from the eyes to a linear color space. The application 206 calculates the best linear fit of the measured reflection colors in relation to the relative light source intensity, per side of the face per color channel. The application 206 averages the slope of the linear fit for the Red, Green, and Blue channels between the Right and Left sides. The resulting average RGB triplet is the color of the reflections. This value is referred to as the "Reflection Color".

In one embodiment, the application 206 calculates the Reflection Color only from the least blurry Image Sets. The application 206 analyzes the reflection in each eye of each Image Set for blurriness. The application 206 does not include the data in the linear fit if the reflection blurriness is above a predetermined threshold.

In the same embodiment, the application 206 converts all of the measured skin region colors to a linear color space. The application 206 calculates the best linear fit in relation to the relative light source intensity, per skin region per color channel. The application 206 averages the slope of the linear fit for the Red, Green, and Blue channels between the facial regions. The resulting average is the color of the skin. This value is referred to as the "Skin Color".

In one embodiment, the application 206 analyzes the skin regions that contribute to the Skin Color to mask out specular reflections on top of the users skin, leaving only the diffuse skin reflections.

In one embodiment, the application 206 calculates the calibrated skin color by dividing each color channel of the Skin Color by the respective, normalized, color channel of the Reflection Color. The resulting value is referred to as the "Calibrated Skin Color".

In one embodiment, the application 206 calculates the calibrated skin color by white balancing the Skin Color to the Reflection Color.

In one embodiment, the application 206 divides the Calibrated Skin Color by the Reflection Brightness and/or the Reflection Size to provide a globally comparable brightness and color value.

In one embodiment, the application 206 measures the region of skin surrounding each eye in addition to the eyes themselves. The application 206 selects the skin region surrounding the eyes by taking the Measured Skin Color of the other face regions and only selecting pixels of the eye region that are within a predetermined range of that value.

In the same embodiment, the application 206 uses the HSV color space to help isolate brightness invariant ranges of color by using only Hue and Saturation. This process helps avoid selecting non skin color pixels such as eyelashes, eyebrows, and the eye itself.

In the same embodiment, the application 206 measures the sampled eye region skin color across different illuminations. The application 206 calculates the best linear fit in relation to the relative light source intensity, per side per color channel. The application 206 calculates the skin color for the eye region by averaging the slope of the linear fit for the Red, Green, and Blue channels per side. The application 206 divides the Skin Color for the Eye Region by the Reflection Color as well as the Reflection Size. The application 206 uses the results as the representative source for the globally comparable skin brightness. The Eye Region is specifically used because it is the closest physically to the light source specular reflection, so it receives a nearly identical amount of light as the eyes regardless of light source orientation or facial topography. This value is referred to as the "Calibrated Skin Brightness"

In one embodiment, the application 206 calculates the "Calibrated Skin Brightness" by calculating the brightness of the "Calibrated Skin Color" at 320 (FIG. 3).

Section 7: Matching Skin Color Information to Ground Truth Values

After completion of the calculating of the Calibrated Skin Color and Calibrated Skin Brightness, referred to as the User's Color Value, the application 206 matches, at 522, the User's Color Value to a Ground Truth Value.

Ground Truth Values are established by assigning a Calibrated Skin Color and a Calibrated Brightness to a real world color through a secondary color matching method. These calibrated values assigned to external colors are referred to herein as "Ground Truth Values".

In one embodiment, Ground Truth Values are established for a range of cosmetic products by the following process. A set of people are chosen whose skin colors are perfect matches to one of the colors in the cosmetic product line. For the rest of the document these people are referred to as models. Finding models that are a perfect match to each cosmetic product color is done through a secondary color matching process.

In one embodiment, this secondary color matching process involves a cosmetologist matching the cosmetic product to a model in person under ideal or representative lighting conditions. Each model then uses the application described in this document to establish their Calibrated Skin Color and Calibrated Skin Brightness. This provides a link between the cosmetic product matched with the model and the Calibrated Skin Color and Calibrated Skin Brightness provided by the application. The model's Calibrated Skin Color and Calibrated Skin Brightness is referred to as the Ground Truth Value for the cosmetic product the model is representing.

The application 206 matches, at 322, the User's Color Value, having been calculated with the method described above, to the closest Ground Truth Value.

Figure 6:
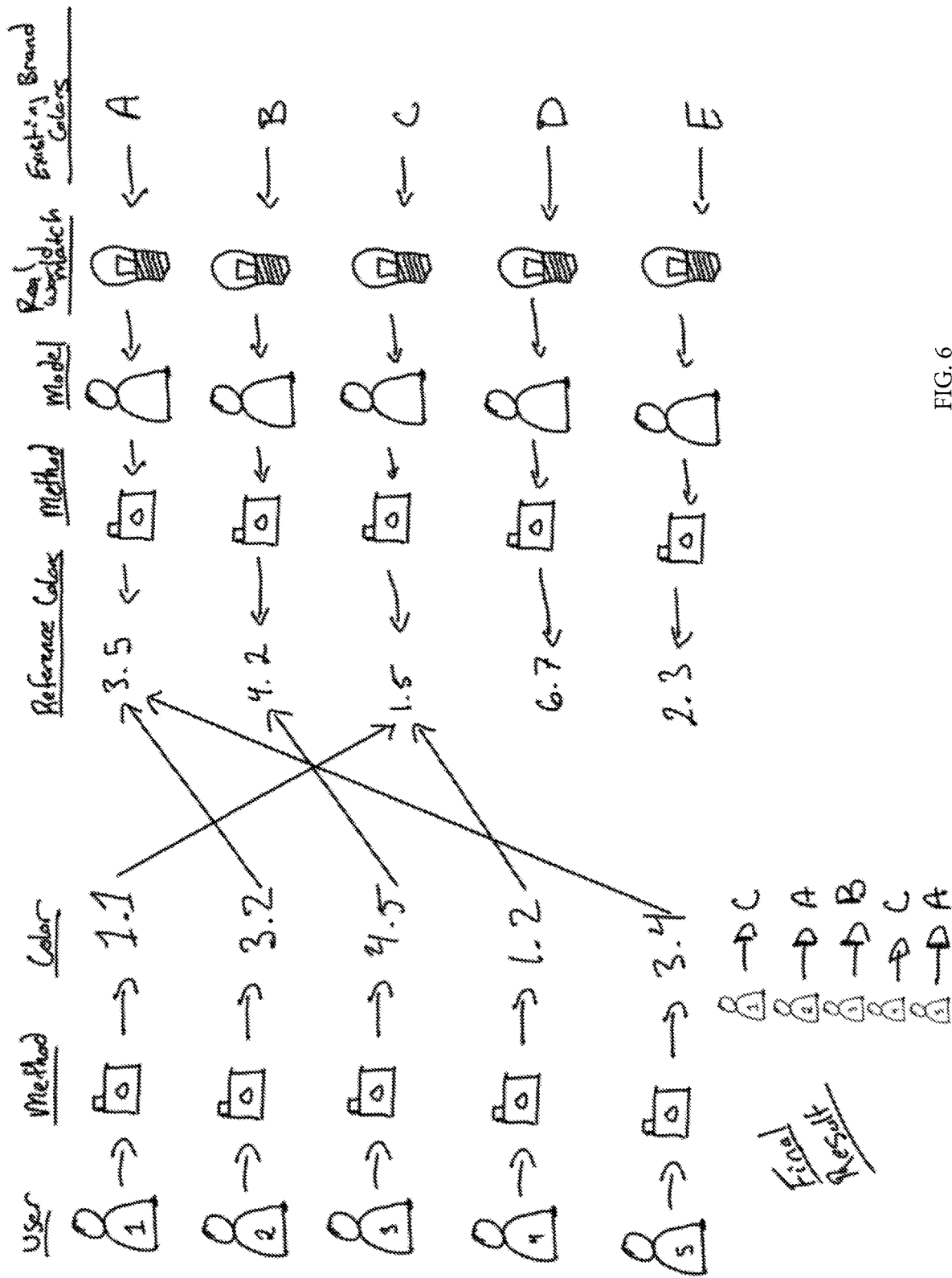
FIG. 6 is a data flow diagram illustrating data flow of cosmetic matching of the process flow of FIG. 3 according to one embodiment.

FIG. 6 is a data flow diagram illustrating data flow 600 of cosmetic matching of the process flow 300 (FIG. 3) according to one embodiment.

In one embodiment, the application 206 converts all of the Ground Truth Values and the User's Color Value to a perceptually uniform color space such as CIELAB. In this color space the application 206 calculates the Euclidean distance between the User's Color Value and all of the Ground Truth Values. The Ground Truth Value with the lowest distance from the user's is the user's Ground Truth Match. The application 206 returns the Ground Truth Match to the application running on the user device 102.

In an embodiment based on the above embodiment, the application 206 asks the user 108 whether the user 108 wants an exact match or a slightly lighter or a slightly darker match. In the case of wanting a lighter match, the application 206 finds the next closest Ground Truth Value in the lighter direction along the "brightness" or "lightness" axis. In the case of wanting a darker match, the application finds the next closest Ground Truth Value in the darker direction along the "brightness" or "lightness" axis. The application 206 returns the preferred color match the application running on the user's device.

Referring again to FIG. 3, the application 206 returns, at 324, the chosen Ground Truth Value to the local application 208 running on the user's mobile device 102.

Section 8: Presenting the Matched Color to the User

The local application 208 running on the user's mobile device receives the matched Ground Truth Value from the application 218 running on the server 104. The local application 208 running on the user's phone makes, at 326, at least one product recommendation to the user based, at least partially, on the received color information.

In one embodiment, the application 206 presents the user 108 with questions, similar to the questions at 316, relating to characteristics of the user's skin and their needs. These questions relate to topics such as, but not limited to skin redness, dryness, oiliness, dehydration, desired coverage type, desired SPF content, or preference for lighter or darker or warmer or cooler results. Based on the results of the questions, the application 206 recommends, at 326, the product that best fits their needs.

In one embodiment, the application 206 presents the user 108 with the ability to purchase the product one time or to subscribe to the product. If the user 108 subscribes to the product, the user 108 will receive a notification from the application 206 when they should be running out of the product. The notification leads the user to sample their skin color again, updating the recorded skin color to match any seasonal, environmental or hormonal changes. The user's mode of payment is either automatically charged, in the case of a subscription, or the user is presented with the option to purchase the updated product.

Examples of Use
Matching makeup foundation
Matching sunblock
Matching lotions
Matching other cosmetics such as eye liner, lipstick
Matching other aesthetic goods such as hair color, jewelry, clothes, etc
Tracking skin changes over time, such as changes in skin elasticity, texture, and conditions
Tracking traits in specific regions of skin over time such as skin texture, wrinkles, spots, acne, sun spots, scars, discoloration, skin conditions such as Vitiligo, Rosacea, Eczema, wounds, redness, hyperpigmentation of the skin, moles or birthmarks (cancer development?) and other dermatological conditions
Dermatological tracking tool
Pharmaceutical tracking tool (tracking progress of products over time)
Recommendation tool for cosmetology professionals (eyebrow/eyelash tinting, makeup application), plastic surgery professionals (cosmetic and medically necessary —skin cancer, wound and scar treatment)
Medical products
Color Matching for virtual try-on Reference in the specification to "one embodiment", "an embodiment", "various embodiments" or "some embodiments" means that a particular feature, structure, or characteristic described in connection with these embodiments is included in at least one embodiment of the invention, and such references in various places in the specification are not necessarily all referring to the same embodiment.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the disclosure include process steps and instructions described herein in the form of an algorithm. It should be noted that the process steps and instructions of the disclosure could be embodied in software, firmware or hardware, and when embodied in software, could be downloaded to reside on and be operated from different platforms used by a variety of operating systems.

The disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium suitable for storing electronic instructions, and each coupled to a computer system bus. Furthermore, the processors referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the systems and methods of the disclosure are not described with reference to any particular programming language. It will be appreciated that a variety of programming languages may be used to implement the teachings of the present invention as described herein, and any references below to specific languages are provided for disclosure of enablement and best mode of the present invention.

As used in the description herein and throughout the claims that follow, "a", "an", and "the" includes plural references unless the context clearly dictates otherwise.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method comprising:
    illuminating a user with a plurality of different light source intensities of a light source, the different light source intensities being over a range of light source intensities;
    capturing a plurality of images of a user, each image being captured-during illumination at one of the different light source intensities;
    processing the plurality of captured images of the user to calculate a skin color of the user from the plurality of captured images based on the illuminations at the different light source intensities;
    determining a closest fit between the calculated skin color of the user and a plurality of predetermined cosmetic formulation colors; and
    providing an indication of the determined closest fit to the user,
    wherein capturing the plurality of images comprises:
        setting the intensity of the light source to a first intensity value of the range of light source intensities;
        determining exposure variables metered under the first light source intensity value to generate baseline exposure variables;
        capturing a first image with the baseline exposure variables and the set intensity;
        capturing a plurality of images with the baseline exposure variables, each capture with a different light source intensity from the range of light source intensities, each different light source intensity being in a predetermined proportion to the first light source intensity; and
        validating the plurality of captured images.

2. The method of claim 1, further comprising:
    providing instructions to the user for orienting an imaging device; and
    providing additional instructions to the user based on actual position and orientation of the imaging device relative to the user.

3. The method of claim 1, wherein the processing the plurality of captured images of the user comprises generating at least one facial landmark for each feature of a plurality of features of the face of the user.

4. The method of claim 1, further comprising preprocessing the images before transferring the images from an imaging device that captures the image to a remote server.

5. The method of claim 1, wherein processing the plurality of captured images comprises:
    calculating calibrated skin color using the plurality of captured images, the images being captured over the range of light source intensities;
    comparing the calculated calibrated skin color of the user to a set of ground truth values representing the calibrated colors of the cosmetic products; and
    determining a single ground truth value that most closely matches the calibrated skin color of the user.

6. The method of claim 1, further comprising providing to the user a prompt that includes information for purchasing the matched product based on the matched ground truth value.

7. The method of claim 1, wherein capturing the image comprises capturing the image based on exposure variables.

8. The method of claim 1, wherein capturing the plurality of images comprises validating the images.

9. The method of claim 1, wherein processing the plurality of captured images of the user comprises converting the captured images to a linear color space.

10. The method of claim 1, wherein processing the plurality of captured images of the user comprises separating each captured image into a group of three images based on color extraction; and extracting eye regions of the captured image.

11. The method of claim 1, wherein capturing the plurality of images comprises aligning images of faces in the plurality of captured images.

12. The method of claim 1, further comprising providing prompts to the user for user input regarding skin or cosmetics or both; receiving user input regarding skin or cosmetics or both; and adjusting the color match based on the received user input regarding skin or cosmetics or both.

13. The method of claim 1, wherein processing of the plurality of images comprises extracting attributes of a specular reflection including size, color, or intensity in one or more captured images.

14. The method of claim 1, further comprising extracting a representative skin region color for each skin region in each captured image.

15. The method of claim 1, wherein processing the plurality of images comprises calibrating color of the skin.

16. The method of claim 1, wherein the determining comprises after completion of the calculation of the Calibrated Skin Color and Calibrated Skin Brightness the values are matched to ground truth values.

17. The method of claim 1, further comprising generating a product recommendation based on a matched ground truth value.

18. A system comprising:
an imaging device;
a light source providing light with different selectable intensities; and
a memory storing computer-executable instructions; and
a processor executing the computer-executable instructions to perform:
  illuminating a user with a plurality of different light intensities of the light source, the different light source intensities being over a range of light source intensities;
  capturing a plurality of images of a user, each image being captured during illuminating at one of the different light source intensities;
  processing the plurality of captured images of the user to calculate a skin color of the user from the plurality of captured images based on the illuminations at the different light source intensities;
  determining a closest fit between the calculated skin color of the user and a plurality of predetermined cosmetic formulation colors; and
  providing an indication of the determined closest fit to the user,
wherein instruction to perform capturing the plurality of images comprises instructions to perform:
  setting the intensity of the light source to a first intensity value of the range of light source intensities;
  determining exposure variables metered under the first light source intensity value to generate baseline exposure variables;
  capturing a first image with the baseline exposure variables and the set intensity;
  capturing a plurality of images with the baseline exposure variables, each capture with a different light source intensity from a range of light source intensities, each different light source intensity being in a predetermined proportion to the first light source intensity; and
  validating the plurality of captured images.

19. A non-transitory computer-readable storage medium comprising instructions executable by a processor, the instructions comprising: instructions for performing:
  illuminating a user with a plurality of different light intensities of a light source, the different light intensities being over a range of light source intensities;
  capturing a plurality of images of a user, each image being during illuminating at one of the different light intensities;
  processing the plurality of captured images of the user to calculate a skin color of the user from the plurality of captured images based on the illuminations at the different light source intensities;
  determining a closest fit between the calculated skin color of the user and a plurality of predetermined cosmetic formulation colors; and
  providing an indication of the determined closest fit to the user,
wherein instruction to perform capturing the plurality of images comprises instructions to perform:
  setting the intensity of the light source to a first intensity value of the range of light source intensities;
  determining exposure variables metered under a first light source intensity value to generate baseline exposure variables;
  capturing a first image with the baseline exposure variables and the set intensity;
  capturing a plurality of images with the baseline exposure variables, each capture with a different light source intensity from a range of light source intensities, each different light source intensity being in a predetermined proportion to the first light source intensity; and
  validating the plurality of captured images.

* * * * *